US009302573B2

(12) United States Patent
Janarthanam et al.

(10) Patent No.: US 9,302,573 B2
(45) Date of Patent: Apr. 5, 2016

(54) DUCT FOR HIGH VOLTAGE BATTERY AIR COOLING EXHAUST AND RECIRCULATION

(71) Applicant: Ford Global Technologies, LLC, Dearborn, MI (US)

(72) Inventors: Suriyaprakash Ayyangar Janarthanam, Westland, MI (US); David Fabricatore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/015,254

(22) Filed: Aug. 30, 2013

(65) Prior Publication Data

US 2015/0060168 A1    Mar. 5, 2015

(51) Int. Cl.
*B60K 11/06* (2006.01)
*B60K 1/04* (2006.01)
*B60H 1/00* (2006.01)
*B60K 1/00* (2006.01)

(52) U.S. Cl.
CPC ............. *B60K 1/04* (2013.01); *B60H 1/00278* (2013.01); *B60H 2001/003* (2013.01); *B60K 11/06* (2013.01); *B60K 2001/003* (2013.01); *B60K 2001/005* (2013.01); *B60K 2001/0416* (2013.01); *B60Y 2400/61* (2013.01)

(58) Field of Classification Search
CPC .......... B60R 16/04; B60K 11/00; B60K 1/04; B60K 2001/003; B60K 2001/005; B60K 11/06; H01M 10/5004; H01M 10/5016; H01M 2/1083; F02M 35/10131; F02M 35/161; B60H 1/00278
USPC .............................. 180/68.1, 68.2, 68.3, 68.5
See application file for complete search history.

(56) References Cited

U.S. PATENT DOCUMENTS

| 4,216,839 | A | * | 8/1980 | Gould | B60K 1/04 104/34 |
|---|---|---|---|---|---|
| 4,896,734 | A | * | 1/1990 | Horiuchi et al. | 180/68.3 |
| 4,976,327 | A | * | 12/1990 | Abujudom et al. | 180/68.2 |
| 5,031,712 | A | * | 7/1991 | Karolek et al. | 180/68.2 |
| 5,082,075 | A | * | 1/1992 | Karolek et al. | 180/68.2 |
| 5,195,484 | A | * | 3/1993 | Knapp | 123/198 E |
| 5,320,190 | A | * | 6/1994 | Naumann et al. | 180/68.2 |
| 5,542,489 | A | * | 8/1996 | Allison et al. | 180/68.5 |
| 5,833,023 | A | * | 11/1998 | Shimizu | B62D 21/00 180/68.5 |
| 6,315,069 | B1 | * | 11/2001 | Suba et al. | 180/68.5 |
| 7,618,740 | B2 | * | 11/2009 | Hamada | H01M 2/1077 429/120 |
| 7,635,040 | B2 | * | 12/2009 | Seo | B60H 1/00278 180/68.1 |
| 7,654,351 | B2 | * | 2/2010 | Koike | B60K 1/04 180/68.1 |
| 7,730,996 | B2 | * | 6/2010 | Van De Flier | B60K 13/04 181/246 |
| 7,823,938 | B2 | * | 11/2010 | McKee | B60K 13/02 293/102 |

(Continued)

*Primary Examiner* — Brodie Follman
*Assistant Examiner* — Brian Cassidy
(74) *Attorney, Agent, or Firm* — David B. Kelley; Brooks Kushman P.C.

(57) ABSTRACT

A vehicle is provided including a battery pack with an exhaust port, an air extractor spaced away from the exhaust port, and other vehicle components. A cargo tub and one or more trim panels are arranged to define a duct spanning from the exhaust port, across the vehicle and to an air extractor spaced away from the exhaust port. Air flows along the duct en route to outside the vehicle via the air extractor. The vehicle may also include a cabin and an inlet to the cabin spaced away from the exhaust port. The cargo tub and one or more trim panels may also be arranged to define a recirculation path from the duct to the inlet such that a portion of the air exiting the exhaust port flows along the recirculation path to the cabin via the inlet.

12 Claims, 6 Drawing Sheets

(56) References Cited

U.S. PATENT DOCUMENTS

| | | | | |
|---|---|---|---|---|
| 8,187,736 B2* | 5/2012 | Park | H01M 10/625 | 165/202 |
| 8,276,696 B2* | 10/2012 | Lucas | B60K 1/04 | 180/68.2 |
| 8,430,194 B2* | 4/2013 | Yamatani | B60H 1/00278 | 180/68.1 |
| 8,496,081 B2* | 7/2013 | Meier | B60K 1/04 | 180/65.1 |
| 8,556,017 B2* | 10/2013 | Kubota | B60K 1/04 | 180/68.1 |
| 8,567,543 B2* | 10/2013 | Kubota | B60K 1/04 | 180/65.21 |
| 8,717,761 B2* | 5/2014 | Aoki | B60K 1/04 | 165/104.33 |
| 8,721,407 B2* | 5/2014 | Mandernach | B60H 1/265 | 454/130 |
| 8,741,465 B2* | 6/2014 | Nagata | B60K 1/04 | 429/120 |
| 8,763,740 B2* | 7/2014 | Marcath | B60K 1/04 | 180/68.2 |
| 8,794,361 B2* | 8/2014 | Lim | B60K 1/04 | 180/68.1 |
| 8,919,833 B2* | 12/2014 | Kim | B60R 5/04 | 293/106 |
| 8,950,536 B2* | 2/2015 | Maguire | B60K 1/04 | 180/68.5 |
| 9,016,412 B2* | 4/2015 | Janarthanam | B60H 1/00278 | 180/68.1 |
| 2008/0296075 A1 | 12/2008 | Zhu et al. | | |
| 2009/0152031 A1 | 6/2009 | Lim | | |
| 2010/0099019 A1* | 4/2010 | Nagata | B60K 1/04 | 429/120 |
| 2010/0294580 A1* | 11/2010 | Kubota | B60K 1/04 | 180/68.1 |
| 2012/0073797 A1* | 3/2012 | Park | B60H 1/00278 | 165/201 |
| 2012/0312610 A1* | 12/2012 | Kim | H01M 2/1077 | 180/65.31 |
| 2013/0153312 A1* | 6/2013 | Kosaki | B60K 1/04 | 180/65.1 |
| 2013/0330587 A1* | 12/2013 | Takahashi | H01M 2/1077 | 429/99 |
| 2014/0302362 A1* | 10/2014 | Takizawa | H01M 10/625 | 429/83 |
| 2015/0147612 A1* | 5/2015 | Nagano | B60K 1/04 | 429/89 |
| 2015/0274104 A1* | 10/2015 | Schneider | B60K 11/06 | 180/68.1 |
| 2015/0291054 A1* | 10/2015 | Duan | B60L 11/1874 | 429/50 |
| 2015/0298540 A1* | 10/2015 | Matsubara | B60K 13/02 | 293/113 |

* cited by examiner

DUCT FOR HIGH VOLTAGE BATTERY AIR COOLING EXHAUST AND RECIRCULATION

TECHNICAL FIELD

This disclosure relates to thermal management systems for a high voltage battery utilized in vehicles.

BACKGROUND

Vehicles such as battery-electric vehicles (BEVs), plug-in electric vehicles (PHEVs) or hybrid-electric vehicles (HEVs) contain a traction battery, such as a high voltage ("HV") battery, to act as a propulsion source for the vehicle. The HV battery may include components and systems to assist in managing vehicle performance and operations. The HV battery may include a battery module with one or more arrays of battery cells interconnected electrically between battery cell terminals and interconnector busbars. The HV battery and surrounding environment may include a thermal management system to assist in regulating temperature of the HV battery components, systems and individual battery cells.

SUMMARY

A vehicle includes a battery pack with an exhaust port, an air extractor spaced away from the exhaust port, a cargo tub, and a trim panel. The cargo tub and trim panel are arranged to define a duct spanning from the exhaust port, across the vehicle, and to the air extractor. Air exiting the exhaust port flows along the duct en route to outside the vehicle via the air extractor. The vehicle may also include a cabin having an inlet spaced away from the exhaust port. The cargo tub and trim panel may further be arranged to define a recirculation path from the duct to the inlet such that a portion of the air exiting the exhaust port flows along the recirculation path en route to the cabin via the inlet. The trim panel may be a rear quarter trim panel including an inner face exposed to the recirculation path and an outer face exposed to outside the vehicle. The trim panel may be a rear floor support trim panel including an inner face exposed to the recirculation path and an outer face exposed to outside the vehicle. The vehicle may also have a cabin trim panel including an inner face exposed to the cabin and a rear quarter trim panel including an outer face exposed to outside the vehicle. An outer face of the cabin trim panel and an inner face of the rear quarter trim panel may be arranged to define the recirculation path from the duct to the inlet such that a portion of the air exiting the exhaust port flows along the recirculation path en route to the cabin via the inlet. The trim panel may be a fascia for a bumper beam and include an inner face arranged to further define the duct. The trim pane may have an outer face exposed to outside the vehicle.

A vehicle includes a battery pack having an exhaust port, a cargo tub having a recessed portion, an air extractor, and a fascia. The fascia may be arranged adjacent to the cargo tub such the recessed portion and fascia define a duct spanning from the exhaust port, across the vehicle, and to the air extractor such that air exiting the exhaust port flows along the duct en route to outside the vehicle via the air extractor. The fascia may include a face exposed to outside the vehicle. The vehicle may also include a cabin and an inlet to the cabin spaced away from the exhaust port. The cargo tub and fascia may be further arranged to define a recirculation path from the duct to the inlet such that a portion of the air exiting the exhaust port flows along the recirculation path en route to the cabin via the inlet. The fascia may be a bumper beam fascia. The fascia may include a recessed portion to further define the duct.

A vehicle includes a battery pack having an exhaust port, an air extractor spaced away from the exhaust port, and a cabin including an inlet spaced away from the exhaust port. The vehicle further includes a cargo tub, a cabin trim panel, and at least one other trim panel. The cargo tub and other trim panel may be arranged to define an exhaust flow path spanning from the exhaust port to the air extractor such that air exiting the exhaust port flows along the exhaust flow path en route to outside the vehicle via the air extractor. The cabin trim panel and the other trim panel may be arranged to define a recirculation flow path spanning from the exhaust port to the inlet such that a portion of the air exiting the exhaust port flows along the recirculation path en route to the cabin via the inlet. The other trim panel may be a rear floor support trim panel including a recessed portion exposed to the recirculation path. The other trim panel may be a rear quarter trim panel including an inner face exposed to the recirculation path and an outer face exposed to outside the vehicle. The cargo tub may include a recessed portion to further define the exhaust flow path. The other trim panel may be a fascia for a bumper beam, and may include an inner face arranged to further define the exhaust flow path. The other trim panel may include an outer face exposed to outside the vehicle.

DETAILED DESCRIPTION

Figure 1:
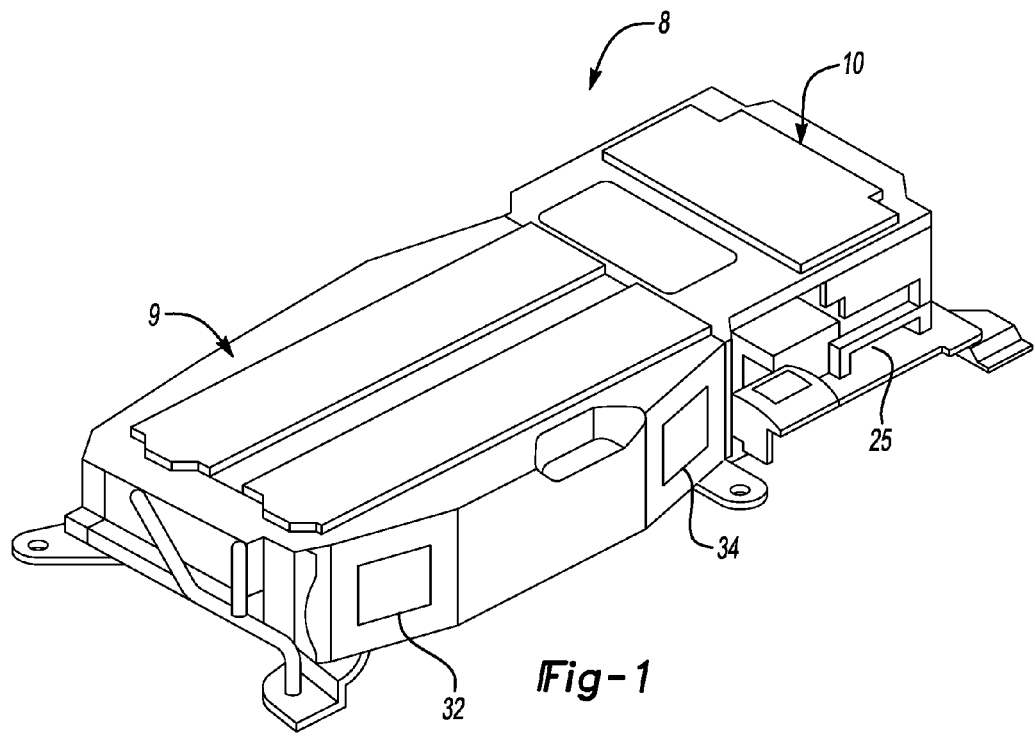
FIG. 1 is a perspective view of a battery pack.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles which utilize an HV battery may include an energy system having a battery pack with components such as one or more battery modules with battery cells, a body electrical control module (BECM), and a DC/DC converter module with a DC/DC converter unit. The battery cells may provide energy to operate a vehicle drive motor and other vehicle systems. The battery pack may be positioned at several different locations including below a front seat, a rear seat, or a location behind the rear seat of the vehicle. Two battery cell arrays may be in electrical communication with the BECM, DC/DC converter unit and other vehicle components. The BECM may receive input signals from various control systems, process information included in the input signals and generate appropriate control signals in response thereto. These control signals may activate and/or deactivate the various components. The DC/DC converter unit may convert high voltage from the battery cells into low voltage for use by the components and systems.

Each battery cell array may include battery cells. The battery cells, such as a prismatic cell, may include electrochemical cells that convert stored chemical energy to electrical energy. Prismatic cells may include a can housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another to facilitate a series connection between the multiple battery cells.

Busbars may be used to assist in completing the series connection between adjacent battery cells or groups of battery cells proximate to one another. Different battery pack configurations may be available to address individual vehicle variables including packaging constraints and power requirements described further herein. The battery cells may be heated and/or cooled with a thermal management system. Examples of thermal management systems may include air cooling systems, liquid cooling systems and a combination of air and liquid systems.

Air cooling systems may use one or more blowers and ducts to distribute air across, for example, the components of the battery module and DC/DC converter module to remove heat generated during vehicle operations. These operations may include charging and discharging the battery cells as well as removing the heat generated during voltage conversion in the DC/DC converter unit. Vehicle components in the environment surrounding the battery pack may be utilized to assist in managing the battery pack's thermal conditions.

Figure 2:
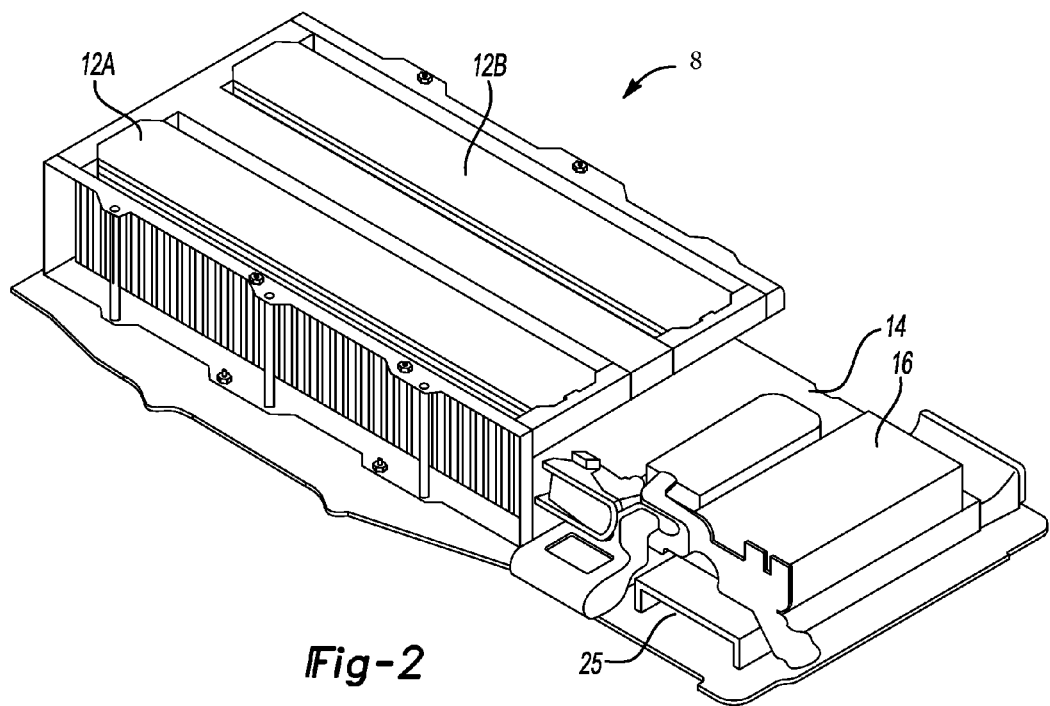
FIG. 2 is a perspective view of the battery pack from FIG. 1 with a battery module cover and DC/DC converter module cover removed.
Figure 3A:
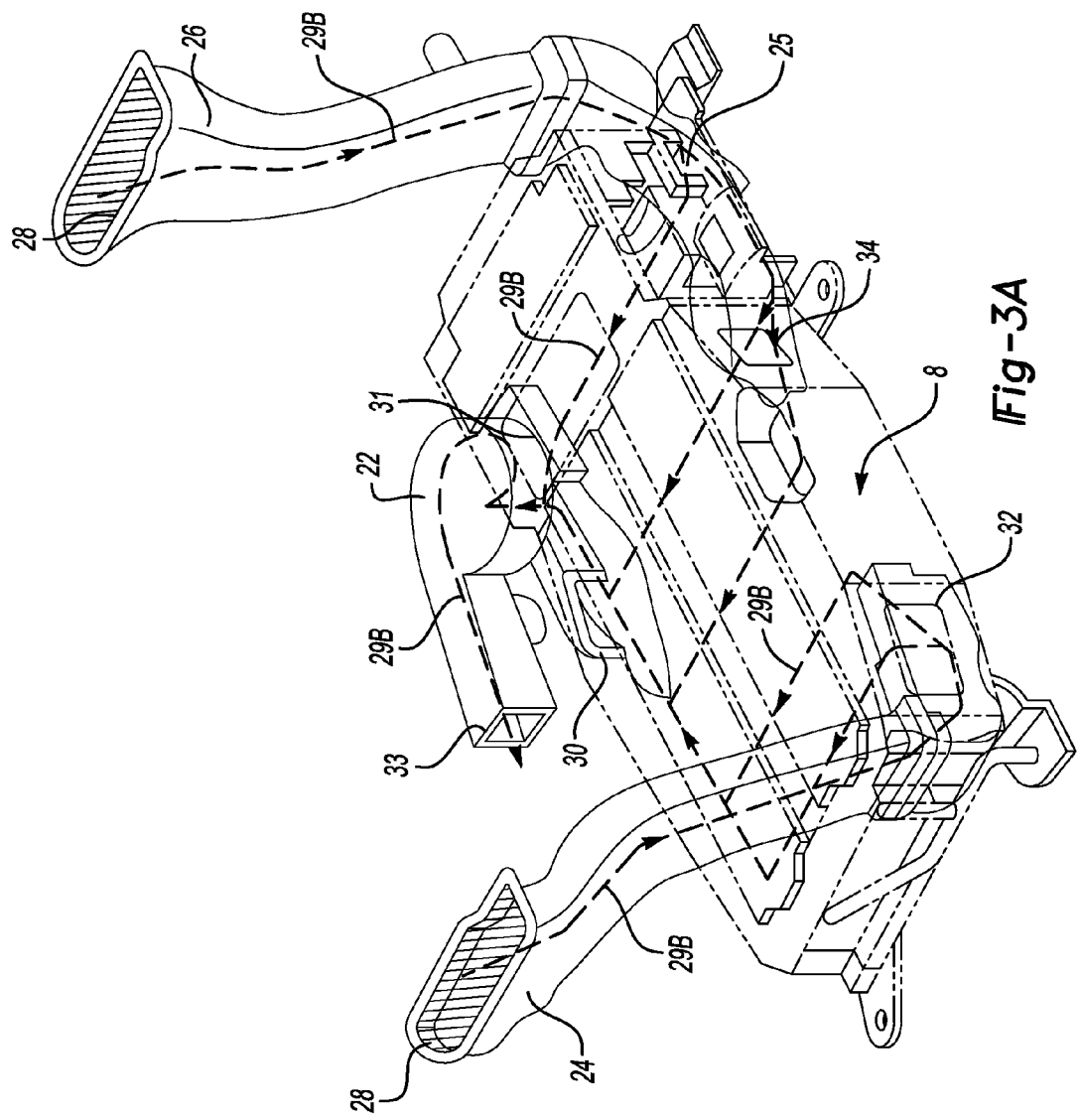
FIG. 3*a* is a perspective view of duct systems, a blower unit and the battery pack from FIG. 1.

For example and now referring to FIGS. 1 and 2, an illustrative battery pack 8 is shown which may include a battery module 9 and a DC/DC converter module 10. The battery module 9 may also be referred to as a traction battery module. The battery pack 8 may further include two battery cell arrays 12*a* and 12*b* (jointly referred to as "battery cell arrays 12"), a BECM 14, a DC/DC converter unit 16, and an air cooling system. The battery cell arrays 12 may also be referred to as cell stacks or first and second cell stacks. FIG. 3A shows a perspective view of some of the components of the air cooling system arranged with the battery pack 8 (battery pack 8 shown in phantom for illustrative purposes). The air cooling system may include a blower unit 22, a first duct system 24, a second duct system 26, and one or more vents 28. Additional examples of the blower unit 22 may include a fan unit and/or air pump. Battery inlet ports 32 and 34 may open to the first duct system 24 and second duct system 26 to facilitate fluid communication with the battery pack 8.

Figure 3B:
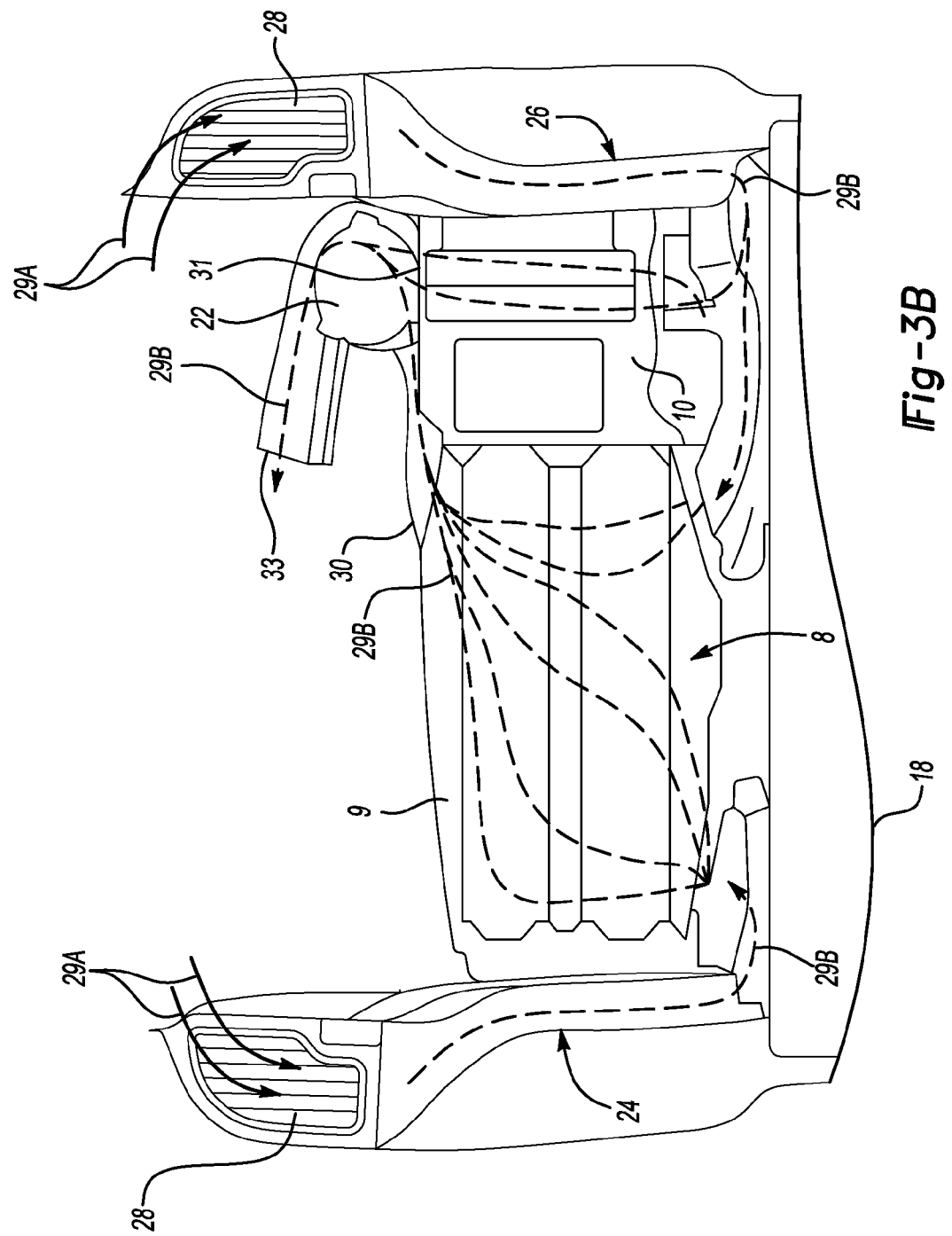
FIG. 3*b* is a plan view of the battery pack and duct systems from FIG. 1 and FIG. 3*a*.

FIG. 3*b* shows the battery pack 8 positioned rearward of a rear seating row 18 and adjacent to a trunk portion which may include a cargo tub described below. Vents 28 may serve as inlet ports to the first duct system 24 and second duct system 26. As such, the vents 28 may assist in facilitating fluid communication between a vehicle cabin climate system, and the first duct system 24 and second duct system 26. The second duct system 26 may also be in fluid communication with the DC/DC converter unit 16 via DC/DC converter unit inlet port 25. The blower unit 22 may be positioned downstream of the battery cell arrays 12 and DC/DC converter unit 16. Further, the blower unit 22 may be positioned proximate to a battery outlet 30 and DC/DC converter unit outlet 31 such that when the blower unit 22 is activated in a first direction, air is pulled across the battery cell arrays 12, the DC/DC converter unit 16, and out a blower outlet port and/or exhaust port 33. The outlet ports herein may also be referred to as exhaust ports. Due to fluid communication with the blower unit 22, the exhaust port 33 may also operate as an exhaust port for air used to cool the battery pack 8. Solid lines and reference arrows 29*a* show the air flow entering the duct systems from the vehicle cabin via the vents 28. Dashed lines and reference arrows 29*b* show the air flow traveling through the duct systems, across the components of the battery pack 8, through the blower unit 22, and exiting the blower exhaust port 33. The lines and reference arrows herein are non-limiting examples of air flow.

Figure 4:
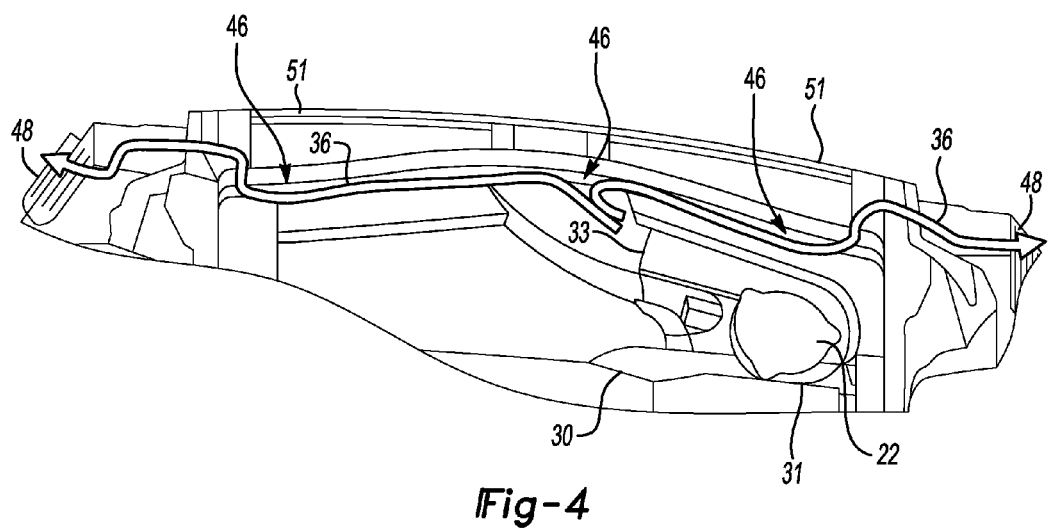
FIG. 4 is a plan view showing a first air flow path from an exhaust port to a pair of air extractors.

Referring now additionally to FIG. 4, blower unit 22 may exhaust air through exhaust port 33 to one or more flow paths and/or ducts. For example, air exiting the exhaust port 33 may travel along a first flow path and/or exhaust flow path to outside the vehicle via the air extractor 48 as shown by lines and reference arrows 36. The first flow path may travel through space between components in the environment between the exhaust port 33 and the air extractors to define a duct 46. Lines and reference arrows 36 may show air flow through duct 46. Duct 46 may also be referred to as virtual duct 46 herein. While duct 46 is referred to as a "duct" and/or "virtual duct," there is no direct ducting as with first duct system 24 and second duct system 26. The virtual duct 46 may take advantage of available and unused space within the vehicle. As such, the duct 46 may further be defined by other vehicle components which create, for example, channels or passageways for air flow therebetween.

Creating virtual ducts may provide advantages for automotive manufacturers if, for example, the manufacturer desires to offer consumers a HV battery powered version of a gas combustion powered vehicle. In this scenario, it may not be feasible to revise and/or redesign a body style and/or structure of the gas combustion powered vehicle to accommodate the HV battery and related components. However, modifications to shared components between the different vehicle versions and unused space therebetween may provide opportunity to package components needed for desired performance from the HV battery in the existing body style and/or structure of the gas combustion vehicle.

Figure 5:
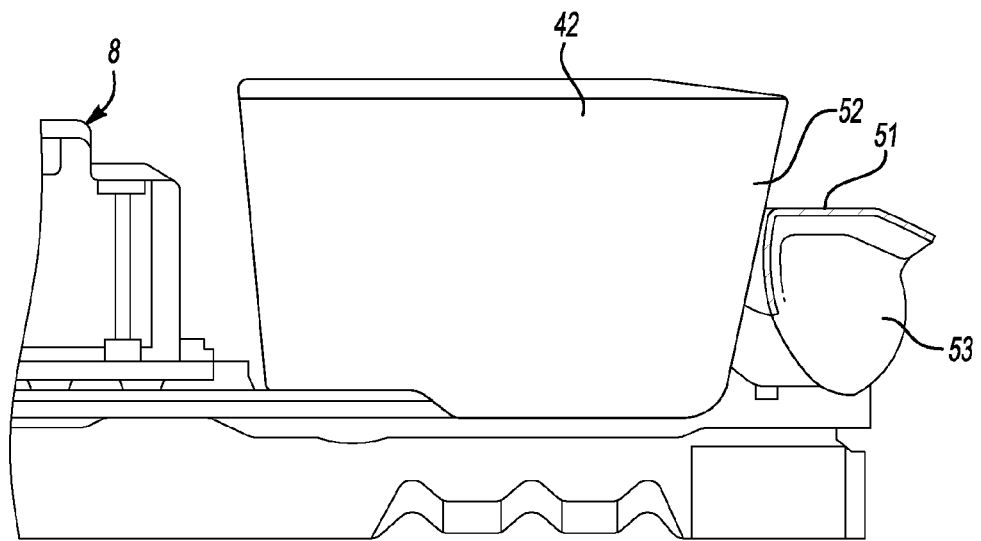
FIG. 5 is a side view, in cross-section, of a cargo tub and fascia.

In one example, the duct 46 may take advantage of space created by a modified cargo tub and space created between trim panels, fascia and sheet metal of the vehicle. FIG. 5 shows an example of a cargo tub 42 and fascia 51 prior to modification for the duct 46. The fascia 51 may be a cover or panel for a bumper beam 53. The cargo tub 42 may be positioned rearward of the battery pack 8 and may include a rear portion 52. The cargo tub 42 may have one or more sides to define a container and may include a channel to accommodate the blower unit 22 and air flow exiting the exhaust port 33.

Figure 6:
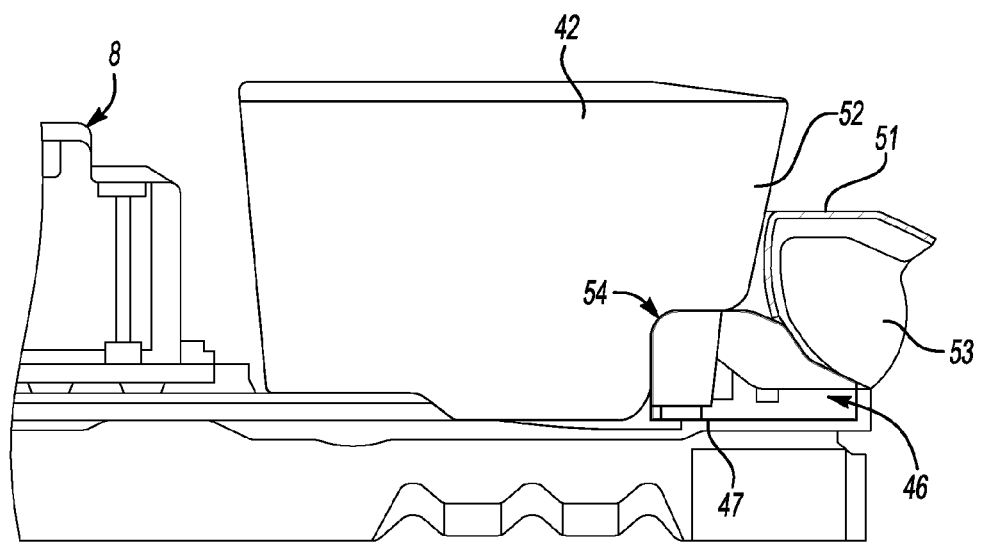
FIG. 6 is a side view, in cross-section, of a modified cargo tub and modified fascia.

In FIG. 6, the cargo tub 42 and the fascia 51 may be arranged to further define the duct 46 which may assist in transferring air from the exhaust port 33 along the first flow path to the pair of air extractors 48. For example, the cargo tub 42 may be modified such that rear portion 52 includes a recessed portion 54. Further, a portion of the fascia 51 may be modified to include a trimmed and/or recessed portion to further define duct 46. The modification to cargo tub 42 may provide additional space for air flow without significantly decreasing storage space within the cargo tub 42. Trimming a portion of the fascia 51 may make use of empty space between the fascia 51 and vehicle body sheet metal, such as a bumper support bracket. For illustrative purposes, FIG. 6 includes a heavier line 47 to assist in visualizing the duct 46 from a side, cross-sectional view.

Figure 7:
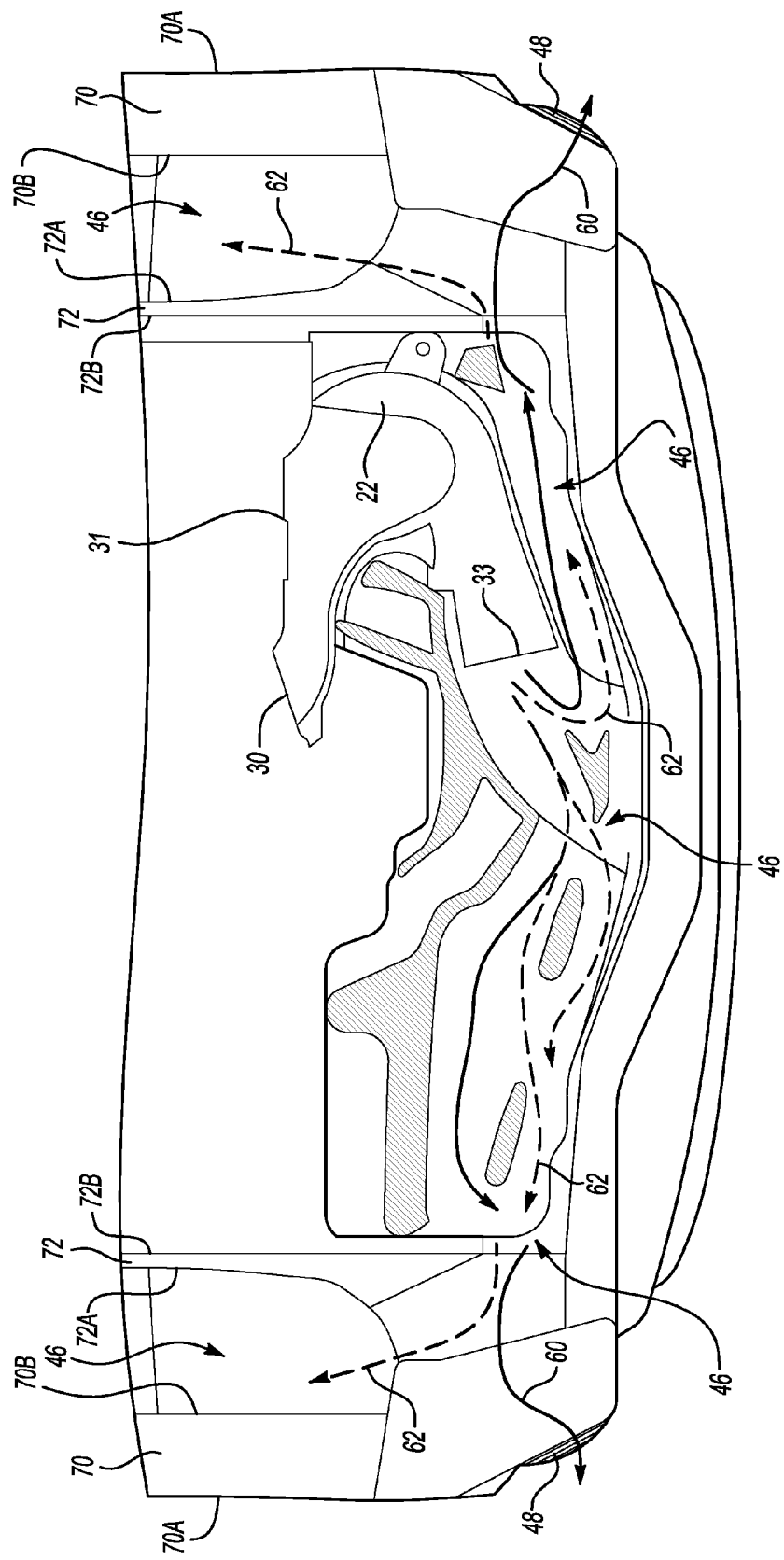
FIG. 7 is a bottom view of a first air flow path from an exhaust port to a pair of extractors and a second air flow path from the exhaust port en route to a vehicle cabin.

The duct 46 may also include a second flow path and/or a recirculation path to return a portion of the air exiting the exhaust port 33 to the vehicle cabin climate system. Now referring to FIG. 7, the second flow path may travel through space between components in the environment between the exhaust port 33 and inlets to the vehicle cabin climate system. Examples of inlets may include gaps between trim panels and holes in trim panels. For example, a cabin inlet may be a seam and/or gap open to the vehicle cabin climate system and defined by one or more interior cabin trim panels. In FIG. 7, solid lines and arrows 60 may represent the first flow path to the air extractors 48. Dashed lines and arrows 62 may represent the second flow path to the vehicle cabin. Both flow paths may mix in duct 46 when initially exiting the exhaust port 33.

For example, the cabin inlet may be spaced away from the exhaust port 33. The cargo tub 42, and/or one or more trim panels may be further arranged to define a recirculation flow path spanning from the duct 46 to the inlet. Rear quarter panels 70 and cabin trim panels 72 may define the recirculation flow path therebetween. Here, an outer face 70a of the rear quarter panels 70 may be exposed to outside the vehicle. An inner face 70b of the rear quarter panels 70 may be arranged with an outer face 72a of the cabin trim panels 72 to further define the recirculation path from the duct 46 to the cabin inlet. An inner face 72b of cabin trim panels 72 may be exposed to the vehicle cabin. As such, a portion of the air exiting the exhaust port 33 may flow along the recirculation flow path en route to the cabin via the inlet.

As another example of trim panels for the second air flow path and/or a recirculation path of duct 46, a rear floor support panel may have an inner face adjacent to the climate system of the vehicle cabin. An inner sheet metal panel may have an inner face adjacent to the inner face of the rear floor support panel. These inner faces may be arranged to define a portion of the duct 46. This portion of duct 46 may be in fluid communication with the climate system of the vehicle cabin at a gap between interior cabin trim panels such that air exiting the exhaust port 33 may recirculate into the vehicle cabin.

As described herein, duct 46 may receive air utilized in thermal management of the battery pack 8 via the blower unit 22 and exhaust port 33. The duct 46 may assist transferring a portion of the air along the first air flow path en route to outside the vehicle via the air extractors 48, and additionally assist in returning a portion of the air along the second flow path en route to the vehicle cabin via the cabin inlet. By recirculating a portion of the air utilized in thermal management, an HVAC system of the vehicle may see efficiency advantages due to a lighter workload. Eliminating one or more direct ducts and replacing the same with a virtual duct may reduce labor costs and time associated with installation/assembly and may reduce vehicle weight to potentially increase vehicle fuel economy. Additionally, since this type of a virtual duct system may utilize available space between body panels and components, additional and/or alternative configurations may be available for various vehicle designs to provide multiple air flow paths to transfer and recirculate air outside and within the vehicle following use in a thermal management system for a battery pack.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery pack having an exhaust port;
   a cabin having an inlet;
   an air extractor spaced from the port;
   a trim panel adjacent the air extractor; and
   a recess defined by a vehicle trunk cargo tub and a bumper beam arranged to define a duct spanning from the port to the extractor, wherein the tub and trim panel are arranged to define a recirculation path from the duct to the inlet.

2. The vehicle of claim 1, wherein the trim panel is a rear quarter trim panel including an inner face exposed to the recirculation path and an outer face exposed to outside the vehicle.

3. The vehicle of claim 1, wherein the trim panel is a rear floor support trim panel including an inner face exposed to the recirculation path and an outer face exposed to outside the vehicle.

4. The vehicle of claim 1, further comprising a cabin trim panel including an inner face exposed to the cabin and an outer face, wherein the trim panel is a rear quarter trim panel having an inner face and an outer face exposed to outside the vehicle, and wherein the outer face of the cabin trim panel and the inner face of the rear quarter trim panel are arranged to define the recirculation path from the duct to the inlet such that a portion of the air exiting the exhaust port flows along the recirculation path en route to the cabin via the inlet.

5. The vehicle of claim 1, wherein the bumper beam includes an inner face arranged to further define the duct and an outer face exposed to outside the vehicle.

6. A vehicle comprising:
   a battery pack including an exhaust port;
   a cargo tub located in a vehicle trunk having a recessed portion extending along a rear side of the cargo tub;

an air extractor located at a side rear portion of the vehicle and adjacent to one end of the recessed portion;

a cabin and an inlet to the cabin spaced away from the exhaust port; and a rear bumper fascia arranged adjacent to the cargo tub such that the recessed portion and fascia define a duct spanning from the exhaust port, across the vehicle and to the air extractor such that air exiting the exhaust port flows along the duct en route to outside the vehicle via the air extractor, wherein the cargo tub and rear bumper fascia are further arranged to define a recirculation path from the duct to the inlet such that a portion of the air exiting the exhaust port flows along the recirculation path en route to the cabin via the inlet.

7. The vehicle of claim 6, wherein the rear bumper fascia has a face exposed to outside the vehicle.

8. The vehicle of claim 6, wherein the fascia includes a recessed portion to further define the duct.

9. A vehicle comprising:
a battery pack including an exhaust port;
an air extractor spaced away from the exhaust port;
a cabin including an inlet spaced away from the exhaust port;
a cargo tub and at least one rear quarter trim panel configured to receive the air extractor and including an outer face exposed to outside the vehicle, wherein the cargo tub and rear quarter trim panel are arranged to define an exhaust flow path spanning from the exhaust port to the air extractor such that air exiting the exhaust port flows along the exhaust flow path en route to outside the vehicle via the air extractor; and
a cabin trim panel arranged with the at least one rear quarter trim panel to define a recirculation flow path spanning from the exhaust port to the inlet such that a portion of the air exiting the exhaust port flows along the recirculation path en route to the cabin via the inlet.

10. The vehicle of claim 9, further comprising a rear floor support trim panel including a recessed portion exposed to the recirculation path.

11. The vehicle of claim 9, wherein the cargo tub includes a recessed portion to further define the exhaust flow path.

12. The vehicle of claim 9, further comprising a fascia for a bumper beam including an inner face arranged to further define the exhaust flow path, and an outer face exposed to outside the vehicle.

* * * * *